Aug. 29, 1933.  W. J. FINNEGAN  1,925,033
METHOD AND APPARATUS FOR RAPID FREEZING AND HANDLING OF COMESTIBLES
Filed April 3, 1931    8 Sheets-Sheet 2

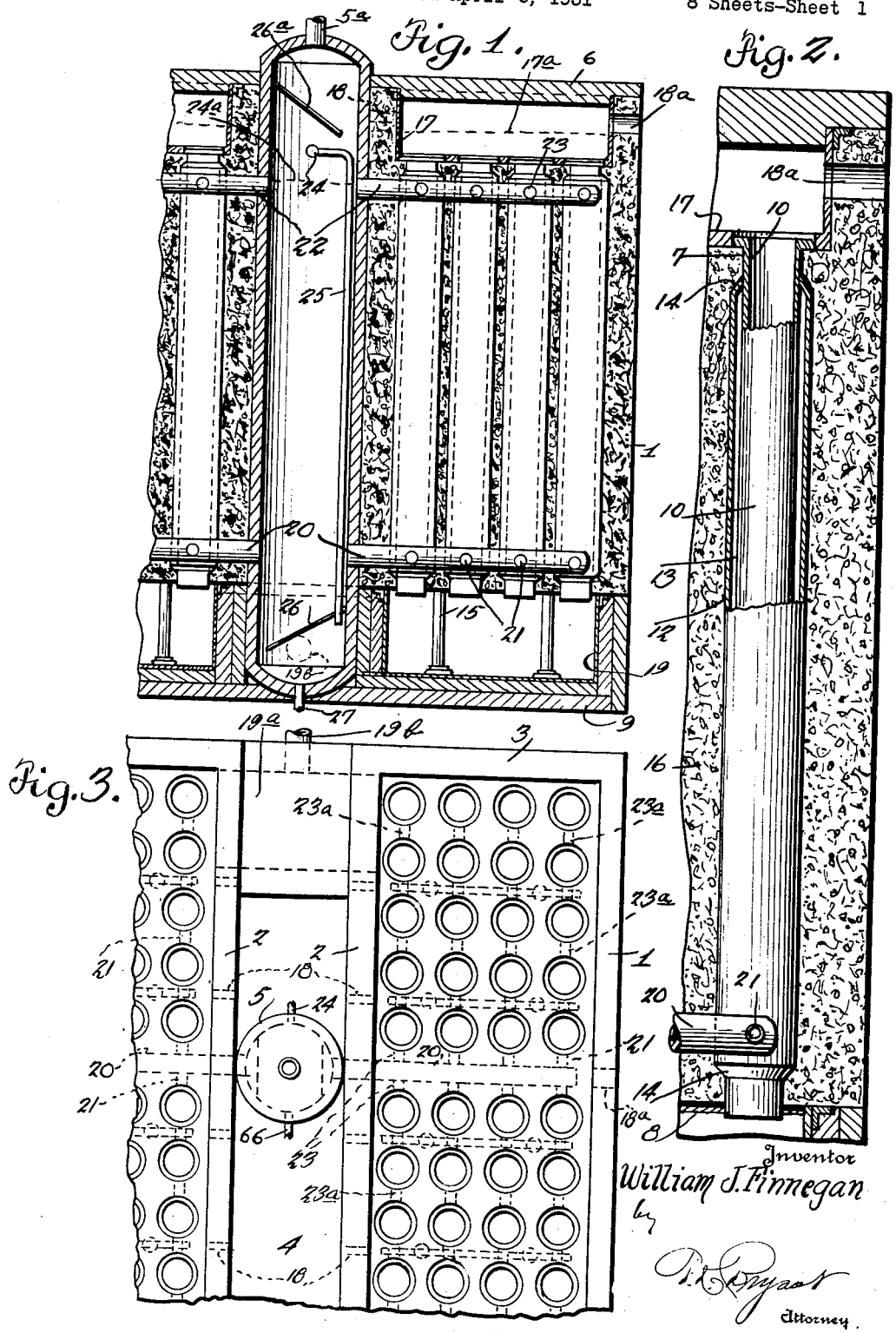

Inventor
William J. Finnegan
by
*[signature]* Attorney.

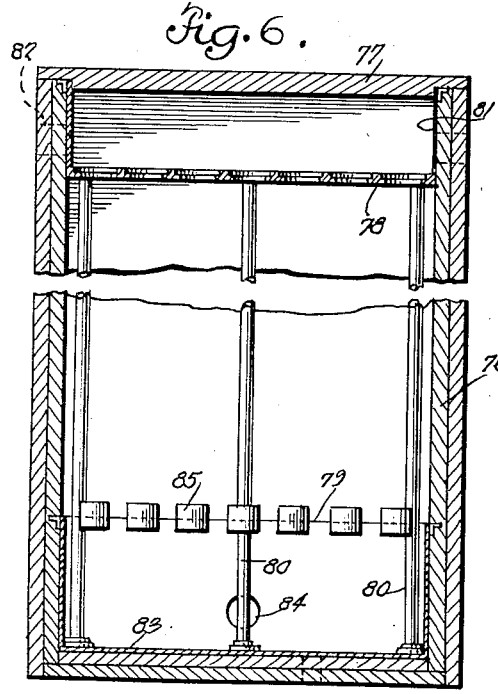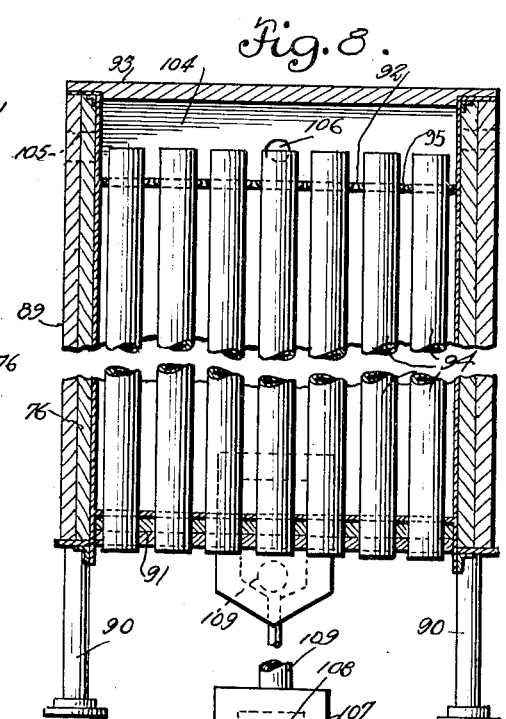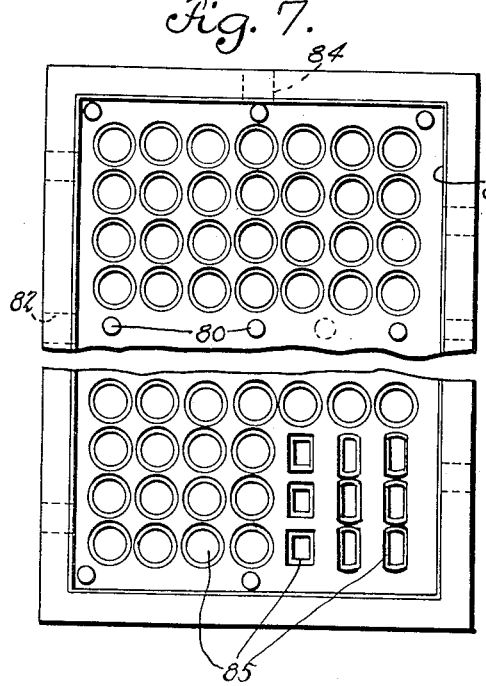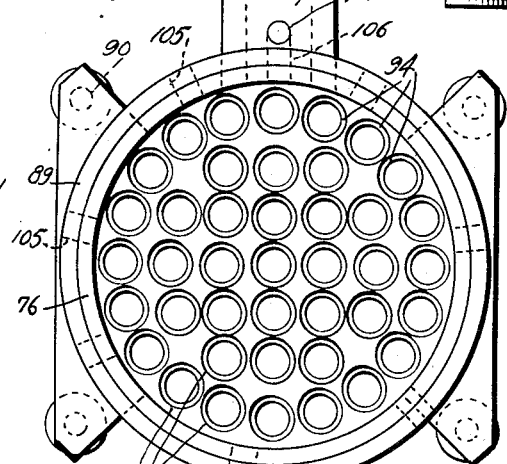

Aug. 29, 1933.    W. J. FINNEGAN    1,925,033
METHOD AND APPARATUS FOR RAPID FREEZING AND HANDLING OF COMESTIBLES
Filed April 3, 1931    8 Sheets-Sheet 4

Inventor
William J. Finnegan.
By
W. Bryant
Attorney

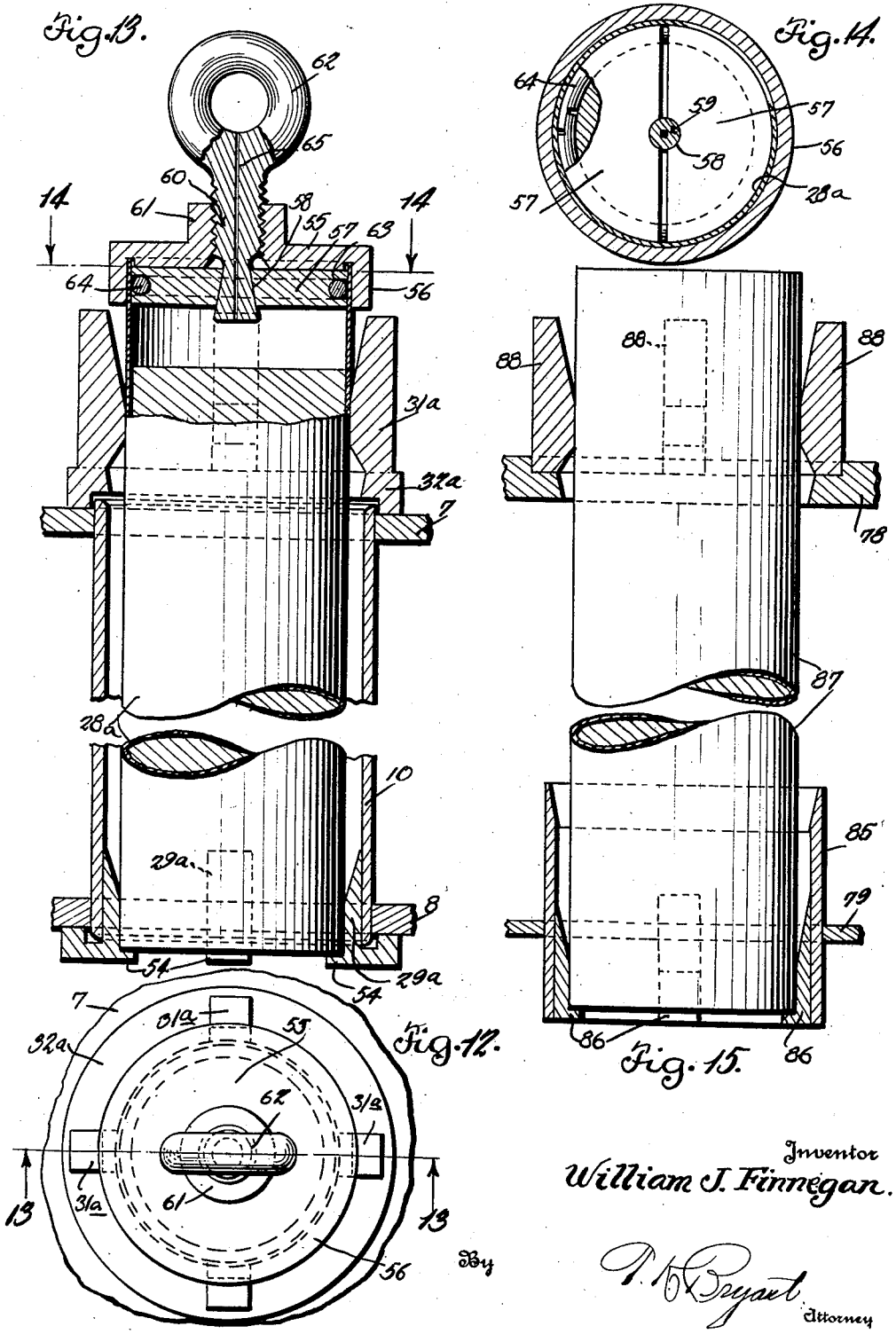

Aug. 29, 1933.  W. J. FINNEGAN  1,925,033
METHOD AND APPARATUS FOR RAPID FREEZING AND HANDLING OF COMESTIBLES
Filed April 3, 1931  8 Sheets-Sheet 6
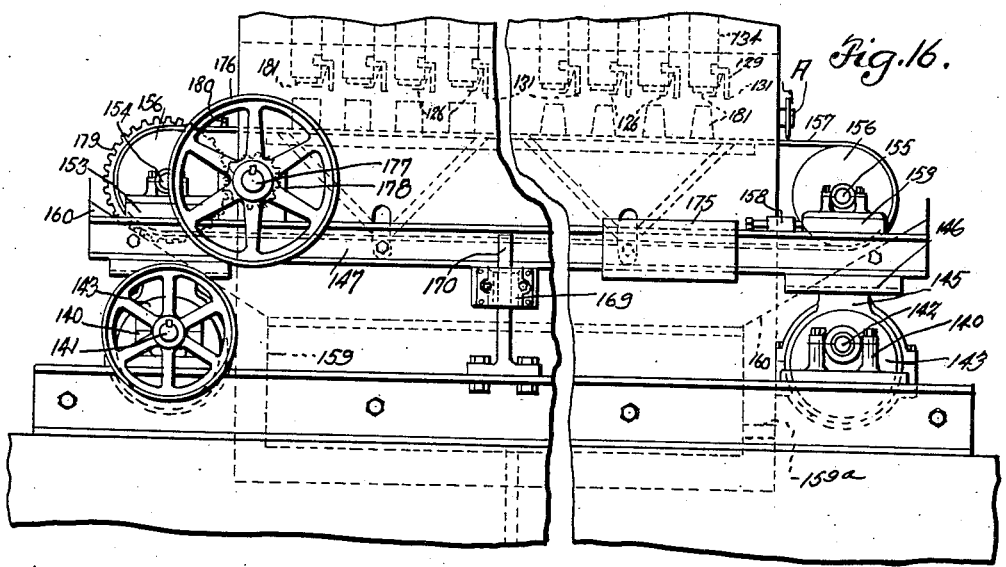
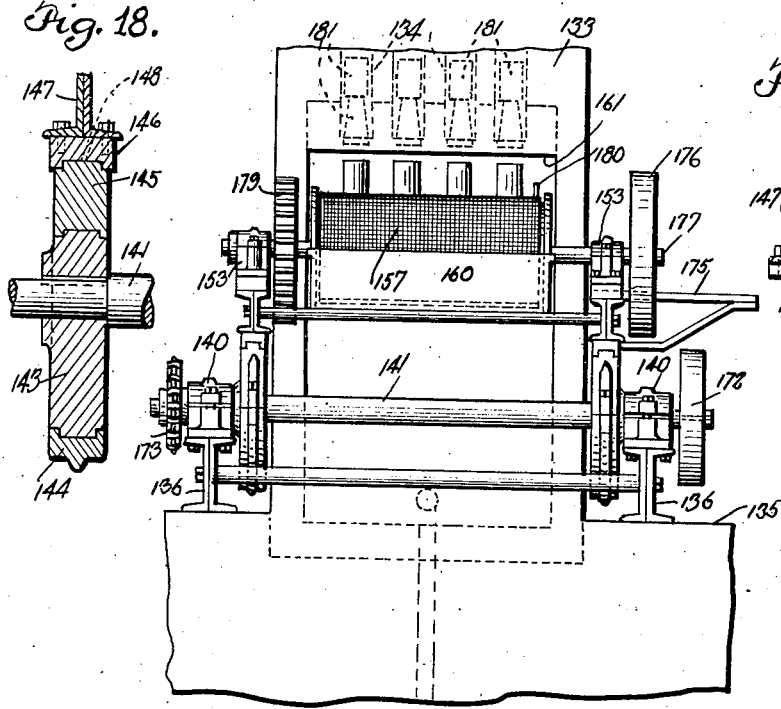
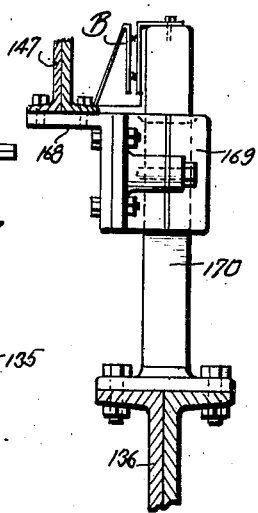
Inventor
William J. Finnegan.
By
Attorney Aug. 29, 1933. W. J. FINNEGAN 1,925,033
METHOD AND APPARATUS FOR RAPID FREEZING AND HANDLING OF COMESTIBLES
Filed April 3, 1931 8 Sheets-Sheet 7
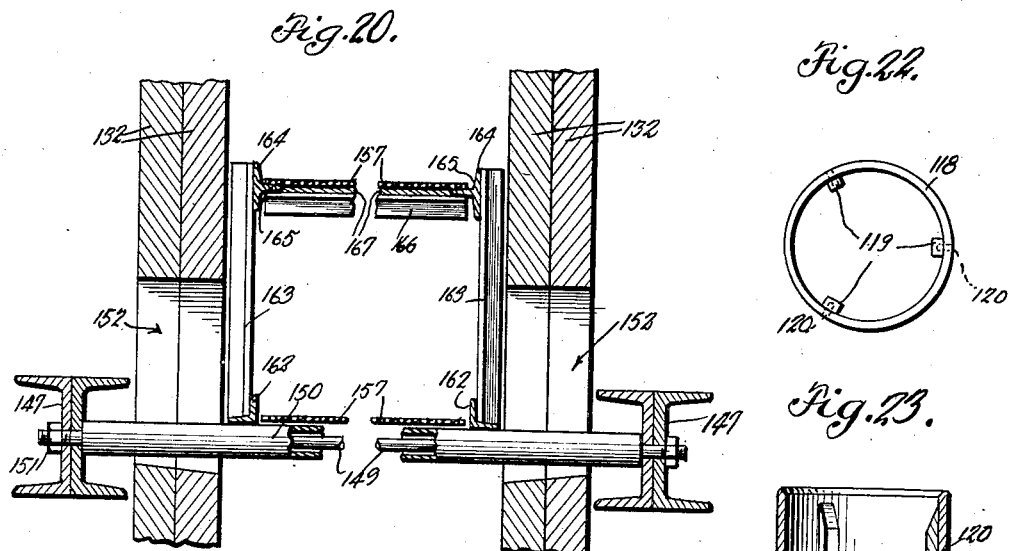
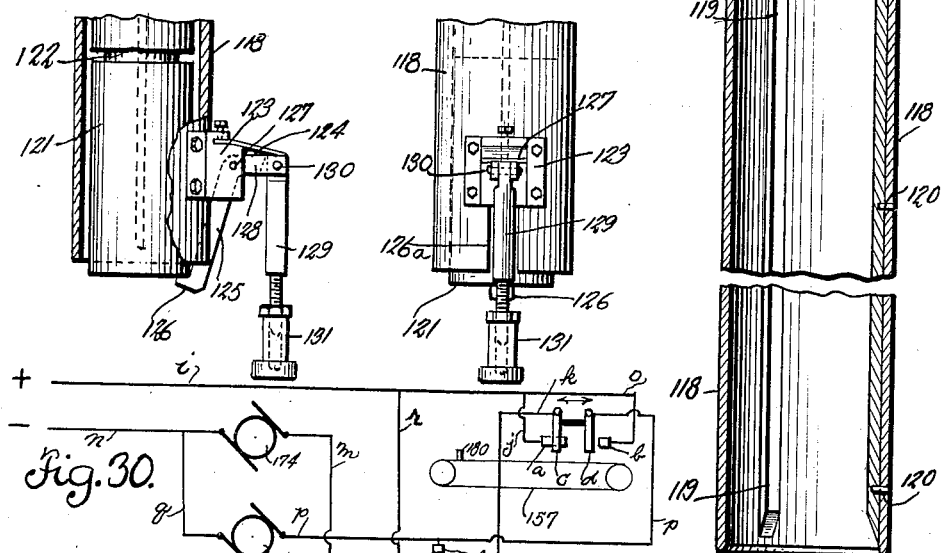
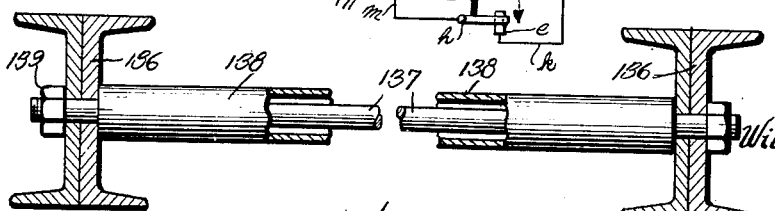
Inventor
William J. Finnegan.
By
J. T. Bryant, Attorney.

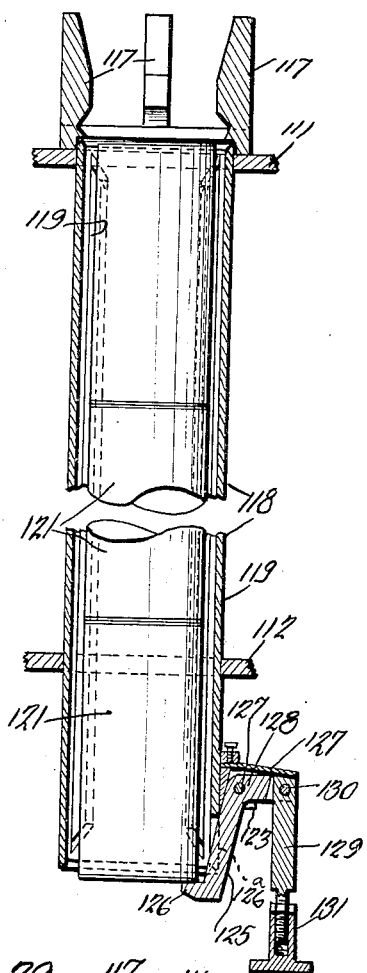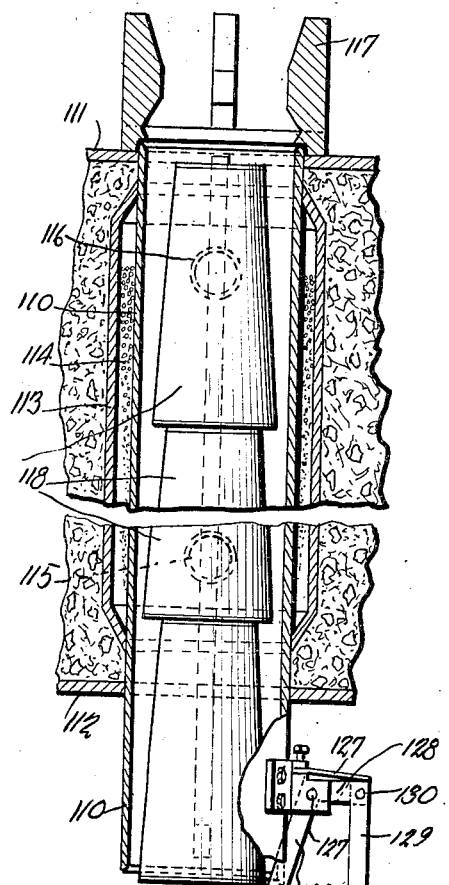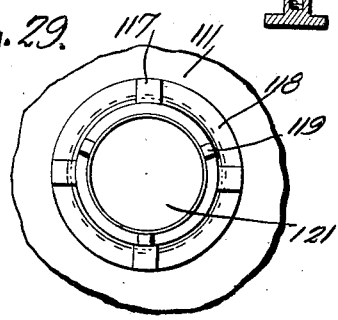

Patented Aug. 29, 1933

1,925,033

UNITED STATES PATENT OFFICE 1,925,033

METHOD AND APPARATUS FOR RAPID FREEZING AND HANDLING OF COMESTIBLES

William J. Finnegan, Atlanta, Ga.

Application April 3, 1931. Serial No. 527,587

37 Claims. (Cl. 62—114)

This invention relates to certain new and useful improvements in method and apparatus for rapid freezing and handling of comestibles.

The primary object of the invention resides in the method and apparatus for rapid freezing and handling of comestibles and other articles or substances subject to a similar treatment with a view of simplifying the construction of the apparatus and rendering the method more efficient and economical.

Another and important object of the invention as compared with prior structures of a like general character is to minimize space required required to accommodate the apparatus and to provide an apparatus and improved method of operation for the economical preservation of comestibles and perishables by rapid freezing.

A further object of the invention is to provide an improved apparatus of the foregoing character in which the articles or materials to be frozen are arranged in appropriate preformed containers that are ready for distribution when harvested from the apparatus, eliminating such practices as filling, wrapping or labeling, after freezing.

Another object of the invention is to provide apparatus for freezing the comestibles or perishables in relatively long tubular containers, thin metal, cellophane, vegetable parchment, glassine, or like material capable of withstanding or immune to erosion or other actions of the liquid heat transferring vehicle, said tubular containers to be divided or parted into desired lengths and capped or sealed for refrigerator packing and shipment to points of consumption.

A still further and important object of the invention is to provide an apparatus of the foregoing character wherein a simultaneous action is present in the rapid freezing of the comestibles or perishables and the cooling of the heat transfer vehicle accomplished in a single or individual apparatus. In this connection, the apparatus is constructed to cause flow of the heat transfer vehicle directly over the surfaces of permanent containers for the comestibles or perishables, or over the surface of a wall in which a cartridge or the like for the container is provided, such heat transfer vehicle being of an appropriate character while the refrigerating medium of a fluent character is caused to flow over the outer wall of the passage for the transfer vehicle for absorbing heat therefrom to effect a more rapid freezing of the comestibles or perishables. The heat transfer vehicle is caused to flow in one direction and the liquid refrigerant is caused to flow in a counter-direction, being initially introduced to that part of the heat transfer vehicle adjacent its end of travel for the more effective absorption of heat from the heat transfer vehicle, resulting in an even freezing from end to end of the material being frozen, the freezing medium, being partially vaporized in its travel through a restricted area, resulting in entrained globules having a siphonic effect and tending to promote a more rapid flow of the refrigerant.

It is a further object of this invention to provide harvesting apparatus for the containers of frozen comestibles or perishables from the lower end of the refrigerator case embodying means for consecutively releasing the lowermost container in the freezing chambers or guide tubes for reception upon an endless conveyor to be moved to a point for packing and storing.

With the above and other objects in view that will become apparent as the nature of the invention is better understood, the same consists in the novel form, combination and arrangement of parts hereinafter more fully described, shown in the accompanying drawings and claimed.

In the accompanying drawings:—

Figure 1 is a fragmentary vertical sectional view of a refrigerating apparatus showing the refrigerant accumulator for the refrigerating medium with laterally positioned upper and lower headers for the support of guide tubes for the reception of materials to be frozen with an upper supply pan and a lower catch basin for a liquid heat transfer vehicle that flows through the tubes;

Figure 2 is an enlarged detail sectional view showing one of the tubes mounted in the apparatus for the flow of heat transfer vehicle therethrough and surrounded by a shell closed at each end and for a flow in opposite direction of the refrigerating medium within the shell and externally of the tube;

Figure 3 is a fragmentary top plan view of the apparatus shown in Figure 1;

Figure 6 is a vertical cross-sectional view, partly broken away of another form of refrigerating apparatus constructed for the support of cartridges containing foods to be frozen, the support being engaged at opposite ends of the cartridges;

Figure 7 is a top plan view, partly broken away, with the cover removed, of the form of apparatus shown in Figure 6, illustrating cartridges of different configurations;

Figure 8 is a vertical sectional view, partly broken away showing the freezing cartridges permanently mounted within the apparatus, which is open at its lower end to permit bottom harvesting of the frozen comestibles or perishables;

Figure 9 is a top plan view of the apparatus shown in Figure 8 with the cover removed;

Figure 12 is a fragmentary top plan view of another form of cartridge showing an eye-bolt carried by the cover thereof to facilitate removal;

Figure 13 is a cross sectional view taken on line 13—13 of Figure 12, partly broken away of another form of cartridge usable with the apparatus shown in Figures 1 to 5;

Figure 14 is a horizontal sectional view taken on line 14—14 of Figure 13, showing the clamp cover for the cartridge in Figure 13;

Figure 15 is a longitudinal sectional view of a form of cartridge usable with the apparatus illustrated in Figures 6 and 7;

Figure 16 is a fragmentary elevational view showing harvesting apparatus associated with the lower end of a refrigerating case and illustrating a motor driven endless conveyor and a motor driven elevator for the conveyor with the freezing tubes for the containers illustrated by dotted lines and a discharge group of containers from the freezing tubes resting upon the endless conveyor;

Figure 17 is a fragmentary end elevational view showing the combined refrigerator case and harvester;

Figure 18 is a detail sectional view of one of the cams for raising and lowering the conveyor supporting frame;

Figure 19 is a fragmentary elevational view, partly in section showing electric contact members associated with the conveyor carrying frame;

Figure 20 is a fragmentary cross-sectional view showing the support for the upper run of the endless conveyor;

Figure 21 is a fragmentary cross-sectional view of the base supporting frame for the harvesting mechanism;

Figure 22 is an end elevational view of another form of guide tube having longitudinally extending ribs upon its inner face for centering containers therein;

Figure 23 is a vertical longitudinal sectional view of guide tube shown in Figure 22;

Figure 24 is a fragmentary sectional view of the lower end of a guide tube with containers illustrated therein and separated by spacers of reduced diameter with latch mechanism carried by the lower end of the tube for controlling discharge of the containers from the tubes;

Figure 25 is a fragmentary elevational view of the tube and associated latch mechanism shown in Figure 24;

Figure 26 is a vertical longitudinal sectional view showing the single guide tube and an enclosing refrigerating channel; similar to the guide tube shown in Figure 2 and equipped at its lower end with latch mechanism controlling discharge of the containers from the tube;

Figure 27 is a bottom plan view of the guide tube and latch mechanism associated therewith as shown in Figure 26;

Figure 28 is a longitudinal sectional view of the form of guide tube shown in Figure 23 with the latch mechanism associated therewith;

Figure 29 is a top plan view of the guide tube shown in Figure 28; and

Figure 30 is a diagrammatic view of the wiring arrangement for the motors associated with the harvesting mechanism.

Figure 4:
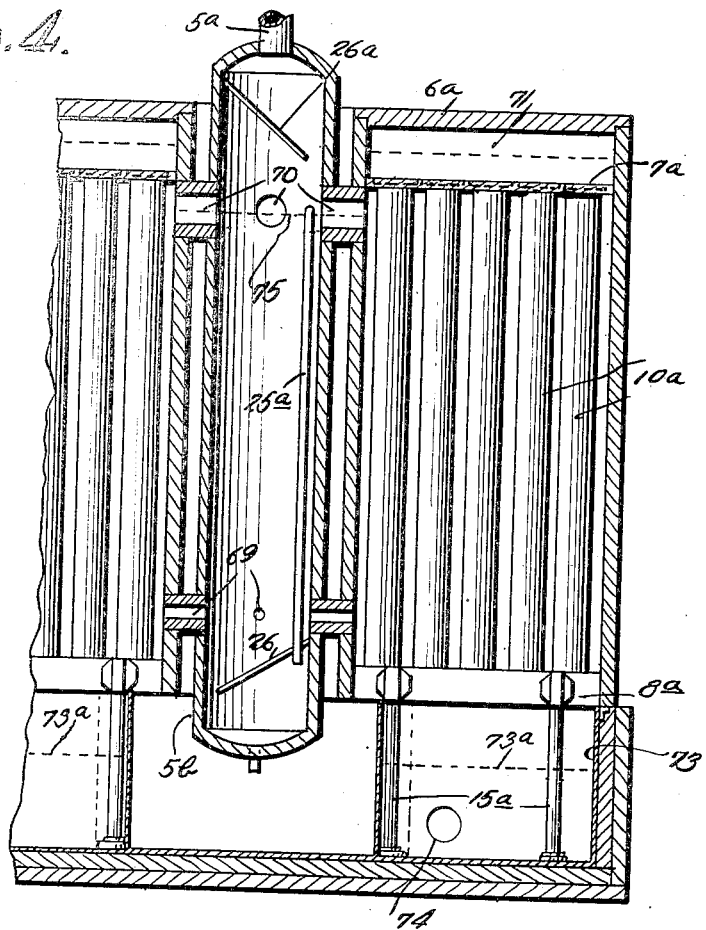
Figure 4 is a fragmentary vertical sectional view of another form of refrigerating apparatus wherein the heat transfer vehicle flows through tubular members while the refrigerating medium from an accumulator is directed into a compartment through which a plurality of the tubular members extend.

The apparatus illustrated in Figures 1 to 3 comprises a refrigerating box or casing constructed of any suitable material, strengthened as desired and insulated in an appropriate manner, and may be formed of sections, side walls 1 and 2 and end walls 3, the side walls 2 being spaced from each other to provide an intermediate compartment 4 in which a perpendicular refrigerant accumulator 5 for the refrigerating medium is mounted. Each section of the refrigerating case has a removable cover 6 mounted thereon in a substantially airtight manner.

Each casing section is provided with upper and lower headers 7 and 8, shown in Figures 10, 11, 13 and 15 which, as shown in Figures 1 to 4 are respectively spaced from the cover wall 6 and the bottom wall 9 of the refrigerator casing and in said headers, a plurality of guide tubes 10 are fixedly mounted as at 11, the guide tubes being preferably arranged in rows as illustrated in Figure 3. Each guide tube is enclosed by a tubular shell 12 of greater diameter than the guide tube and is spaced from the tube to provide an annular channel 13, the opposite ends of the shell 12 being swaged inwardly and preferably welded or otherwise connected to the guide tubes 10 at points spaced inwardly from the ends thereof as at 14, guide tubes and shells being supported on the standard 15 within the casing section as shown in Figure 1. The insulation packing 16 of cork or the like in any preferred form completely fills the spaces between the shells 12 for effective and economical operation of the apparatus and to obtain maximum insulation.

The upper ends of each casing section above the header 7 is provided with a pan 17 to receive a fluent heat transfer vehicle supplied thereto through inlets 18 illustrated by dotted lines in Fig. 1, each pan being provided with an overflow opening 18a that has communication with a catch basin 19 in the lower end of each casing section, resting upon the bottom 9 and disposed beneath the lower header 8.

A refrigerant supply pipe 20 projects from the accumulator 5 adjacent the lower end thereof into each casing section as shown in Figs. 1 and 3 and each pipe 20 has a nipple connection 21 with adjacent shells 12, the shells of the other series being connected by nipples 21a. Similar pipes 22 extend outwardly of the upper end of the accumulator 5 and enter each adjacent section adjacent to and beneath the top header 7 and have nipple connections 23 with adjacent shells 12 in their upper ends, the remaining series being connected by nipples 23a. The refrigerating medium that is of a fluent character is delivered to the upper end of the accumulator 5 at the point 24 shown in Figure 1 where a liquid level 24a is maintained by automatic refrigerant liquid float controlled feed valve, the liquid refrigerant flowing downwardly through the downcomer pipe 25, adjacent said outlet to the lower end of the accumulator and beneath the inclined baffles 26 provided for separating any foreign matter, such as oil in the refrigerating medium for collection upon the bottom of the accumulator to gather as a sediment which may be withdrawn from the accumulator by a valve controlled drain 27. The downcomer pipe 25 is structurally designed to effect condensation of flash gas before the refrigerant is liberated into the accumulator.

Figure 10:
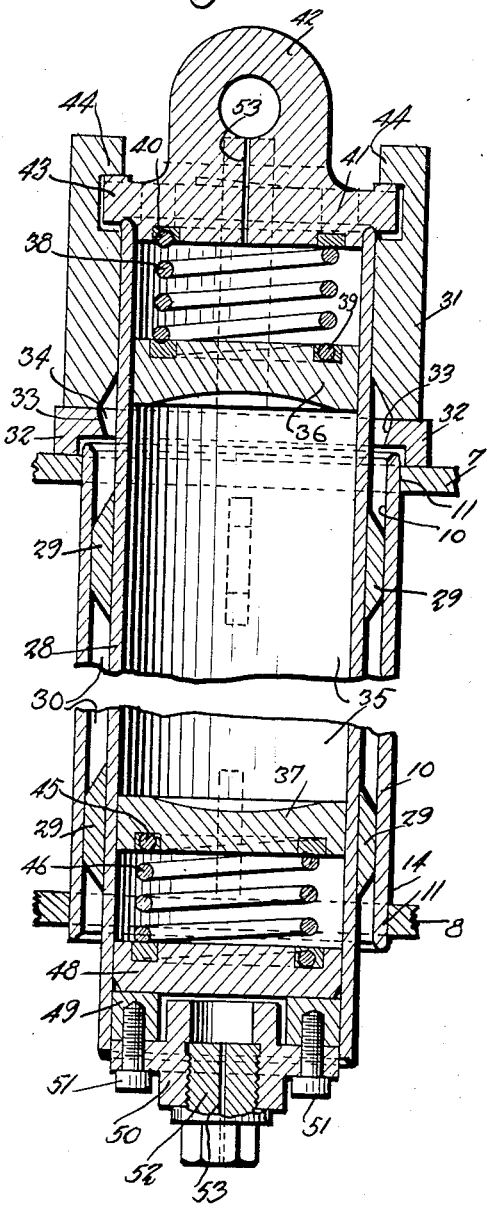
Figure 10 is a longitudinal sectional view of the freezing cartridge adapted for use with the apparatus shown in Figures 1 to 5, a part of the apparatus being illustrated, the freezing cartridge being removable at the upper end of the apparatus.

The bottom wall of the pan 17 is provided with openings as shown in Figure 2 that register with the open upper ends of the tubular guides 10 and cartridges of different type such as shown in Figures 10 and 13 are removably mounted in the guide tubes 10, the cartridges containing containers for comestibles or perishables to be frozen. As shown in Figure 10, the cartridge comprises an open ended tubular casing 28 carrying spaced lugs 29 upon its outer face to engage the inner face of the guide tube 10 for centering the cartridge casing and provide an annular space 30. A series of circumferentially spaced longitudinally extending lugs 31 are carried exteriorly of the upper end of the tubular casing 28 and when said casing is positioned in the guide tube 10, the lower ends of the lugs 31 rest upon a ring 32 mounted upon the bottom of the pan 17 as shown in Figure 12 and surrounding the upper end of the guide tube 10 as shown in Figure 10. The inner face of the ring 32 is inclined as at 33, providing an annular face 34 for distributing and directing the heat transfer vehicle over the exterior face of the cartridge casing 28 and the interior face of the guide tubes 10. A container 35 for comestibles or perishables to be frozen is placed in the cartridge casing 28 and is resiliently engaged at each end thereof within the cartridge by tensioned follower blocks 36 and 37. The upper block 36 is engaged by one end of a coiled spring 38, said end 39 of the coiled spring being permanently anchored in an annular groove in the block 36, while the other end 40 of the coil spring is permanently anchored in an annular groove, in the lower face of a plug cap 41 having handles 42 to facilitate removal thereof, the plug cap being retained in position by peripheral lugs 43 having inclined upper faces engaged with correspondingly formed faces on inwardly extending shoulders 44 on the upper ends of the lugs 31. The lower follower block 37 has one end 45 of a coil spring 46 permanently anchored in an annular groove in the lower face thereof while the other end 47 of the spring 46 is permanently anchored in an annular groove in the sliding block 48. An abutment ring 49 for the sliding block 48 is permanently fixed as by welding in the lower open end of the tubular cartridge casing 28 and a centrally apertured closure 50 for the lower end of the cartridge casing 28 is retained in position by the screws 51 passed through and engaged with the abutment ring 49, a removable screw plug 52 being mounted in the closure member 50, which upon removal will permit insertion of a suitable implement for engagement with the sliding block 48 to facilitate easy removal at the upper end of the cartridge casing. The plug cap 41 and the screw plug 52 are provided with vent openings 53 permitting air escape at each end of the cartridge casing upon expansion of the frozen commodities.

In the construction shown in Figure 13, the cartridge casing 28a is supported at its lower end within the guide tube 10 and in spaced relation thereto by means of centering lugs 29a permanently retained in position within the tube 10, each lug 29a carrying an inwardly directed lug shoulder 54 for the support of the lower closed end of the cartridge casing 28a. The distributing ring 32a for the heat transfer medium has upstanding circumferentially spaced lugs 31a formed integral therewith, the inner upstanding edges of the lugs 31a being welded or otherwise secured to the upper projecting end of the cartridge casing 28a whereby the cartridge casing and distributing ring 32a are movable as a unit. The closure for the open upper end of the cartridge casing 28a as shown in Figures 12 to 14, includes a cap 55 having an annular depending flange 56 enclosing the upper end of the cartridge casing. A radially split disk 57 is confined within the flange 56, the sections thereof having mating notches 58 forming a circular opening through which the wedge-shaped conical end 59 of a screw plug 60 passes, the screw plug 60 above the conical end being threaded through the central upstanding boss 61 rising from the cap 55 with a manipulating ring 62 at its upper end, there being a vent opening 65 in the screw plug 60 between the interior of the cartridge casing and the atmosphere. A circumferential groove 63 formed in the sections of the disk 57 receives an expansion coil spring or ring 64 that is moved into engagement with the inner face of the cartridge casing, as will be evident from an inspection of Figures 13 and 14 upon operation of the screw plug 60 for locking the cap 55 in position on the cartridge casing, and in this form of the invention, the caps 55 and handle end 62 are removable for harvesting the cartridge casing from the guide tube 10 of the refrigerating apparatus.

In the operation of the form of invention shown in Figures 1 to 3, with the cartridge 28 or 28a positioned in the guide tubes 10, a heat transfer vehicle, such as a brine solution is fed to the pans 17 in any suitable manner through the inlets 18 and a constant level 17a of the heat transfer vehicle is maintained in the pans with the excess outletting through the overflow 18a and conveyed by a conduit to the catch basin 19 at the lower end of the apparatus, each catch basin 19 being in communication with an equalizing trough 19a as shown in Figure 3 which has a return pipe connection 19b with pump apparatus for effecting the return of the brine solution to the pan 17 to be inletted thereto as at 18, thus completing a cycle of operation, the transfer vehicle being fed through the guide tubes 10, direct to the outer faces of the cartridges or containers and the inner faces of the guide tubes for thoroughly wetting the surface and for an even distribution thereover by the distributing rings 32 or 32a, the heat transfer vehicle collecting in the catch basin 19 as will be obvious from an inspection of Figure 1. The refrigerating medium, such as ammonia, carbon dioxide or the like, is delivered by way of a float controlled valve chamber (not shown) to the point 24 to the upper end of the accumulator 5 for downward discharge through downcomer 25, exiting into the accumulator at a point below the baffle 26. Foreign matter, such as oil is separated from the liquid refrigerant and collects in the bottom of the accumulator for drainage as at 27, when desired. The refrigerant flows into the lateral pipes 20 and by nipples 21 and 21a, the liquid refrigerant enters the channels surrounding guide tubes 10 and within the shell 12, the liquid refrigerant entering the lower ends of the channels 13 and absorbing heat from the liquid heat transfer vehicle flowing downwardly through the guide tubes, violent boiling of the refrigerant being effected and entrained globules therein rapidly rising in the channels.

All surfaces below refrigeratnt liquid level at point 24a will be wholly wet by the refrigerant. Owing to the rapid transfer of heat through the walls of the freezing cartridge receptacles, caused by a complete internal liquid wetted surface and high liquid velocity over this surface downwardly developed by the force of gravity and static head of liquid in the liquid distributing pan 17, there will be a violent boiling of refrigerant within the channel 13. It has been found that the rapid rising of the gas bubbles within this relatively restricted refrigerant space 13, will develop a siphoning effect upon the incoming liquid refrigerant. This in conjunction with the difference in static head of liquid in the accumulator as compared to that in the channels causes a rapid circulation of the liquid refrigerant up through the refrigerant space 13 into gas connections 23 and pipe 22 downward through accumulator and into the liquid refrigerant pipe 20 and through communicating connections for a repetition of the refrigerant circulating cycle. The major desirable effects produced by this liquid refrigerant circulation is that the flow of the liquid refrigerant over the surfaces is in the opposite direction to the flow of the liquid heat transferring vehicle, thus speeding up the transfer of heat materially. The rapid flow of liquid refrigerant over the internal evaporating surfaces causes the removal of minute gas bubbles during the earlier part of their formation, thus keeping the evaporating surfaces clear of gas and positively wetted with the liquid refrigerant at all points. This materially increases the heat transfer between the liquid heat vehicle and the refrigerant.

Due to a positive liquid to liquid transfer of heat at relative high velocities over the external and internal surfaces with counterflow principles and that the liquid used as a heat transferring vehicle is being cooled in practically the whole length of the freezing cartridge receptacles, it will be readily understood that the temperature of the liquid being delivered to the freezing cartridge on top will be approximately the same temperature coming off the freezing cartridge at the bottom, consequently the congealing of the produce within the freezing cartridge or containers will be uniform throughout the length thereof. Further appreciation of the rapid transfer of heat occuring in this apparatus will be gained through due consideration of the following facts. The commodity being frozen within the tubular container is usually a liquid or semi-solid with liquid fill, consequently the heat transfer from this produce will proceed through the preformed container; the container having direct contact with the produce on the inside and the heat transferring vehicle on the outside where the liquid vehicle is applied directly on the container or direct contact with the metal cartridge on the outside when it is required to protect the container from the deteriorating effects of the liquid heat vehicle. The liquid heat transferring vehicle travels over the external surfaces of the container or freezing cartridge thoroughly wetting the surfaces at a high rate of speed and at the same time wetting the transfer surfaces of the evaporator at a corresponding speed with a counterflow of liquid refrigerant with all surfaces thoroughly wetted on the inside of the evaporator. This arrangement develops a maximum rapidity of heat transfer from the produce to the refrigerant. It will be noted that the commodity to be frozen is placed at a point as near the refrigerant as practical without sacrificing or retarding some of the advantages hereinbefore mentioned.

The vaporizing or gasifying of the refrigerant constantly absorbs heat and creates a siphonic action in the channels 13, outletting at the upper ends of the channels through the nipples 23 and 23a for return to the accumulater 5, the inclined baffles 26a in the accumulator tending to prevent the escape of liquid ammonia through the gas return pipe 5a from the upper end of the accumulator to the compressor, the liquid refrigerant being returned to the accumulator through the gas pipes 22 remaining in the accumulator while all gaseous matter is returned through the pipe 5a to the compressor, the level of refrigerating medium in the accumulator being maintained at the level 24a shown in Figure 1, this level being disclosed by the vacuum gage glass 66 shown in Figure 3. Due to a positive liquid to liquid transfer of heat through the walls of the guide tube 10 with the counter-flow arrangement described, the heat transfer vehicle, such as brine, is being cooled over the entire length of the freezing cartridge container with the result that the temperature of the cartridge or container is maintained constant throughout its length by equal absorption of heat and a consequent even congealing or freezing of the comestibles or perishables.

The cartridge cap 41 is removable from the cartridge casing 28 by disengaging the shoulder 43 on the caps of the shoulder 44 on the lugs 31, the block 36 being removable with the cap 41 and upon removal of the screw plug 52 at the lower end of the cartridge, a suitable implement may be engaged with the sliding block 48 for extracting the container 35. The same method may be employed in removing the cartridge 28a from the guide sleeve 10 shown in Figure 13.

Figure 5:
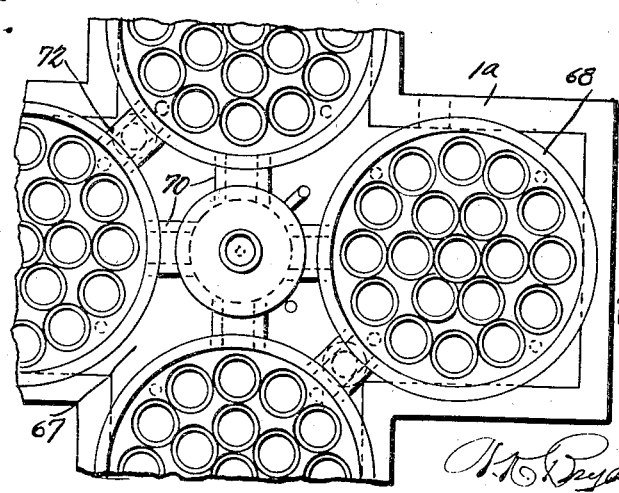
Figure 5 is a fragmentary top plan view of the form of apparatus shown in Figure 4.

The apparatus illustrated in Figures 4 and 5 is adapted to have the freezing cartridge shown in Figs 10 and 13 associated therewith. The freezing or refrigerating casing, as shown in Figure 5, comprises insulated wall sections 1a communicating with a central chamber 67, each casing section 1a comprising a drum housing 68 having headers 7a and 8a associated with the upper and lower ends thereof. A refrigerant accumulator 5b is arranged in the central chamber 67 and adjacent its lower ends has nipple connections 69 with each drum housing 68 for the supply of liquid refrigerating medium to the drum housings while the upper ends of said housings have nipple connections 70 with the upper end of the accumulator 5b for return passage of the refrigerant. The upper end of the accumulator 5b has a gas outlet 5a disposed above the baffle 26a while a downcomer pipe 25a applies liquid refrigerant to the lower end of the accumulator at a point below the baffle 26. The upper and lower headers 7a and 8a have opposite ends of cartridge receiving guide tubes 10a connected thereto for the reception of cartridges of the forms illustrated in either Figures 10 or 13, the guide tubes and headers being supported on adjustable feet 15a illustrated in Figure 4. A cover 6a is provided for each casing section 1a while a pan for the reception of a heat transfer vehicle, such as brine is arranged in the space 71 above each header 7a, a plurality of housings being provided with connections 72 between adjacent pairs of pans in the drums for the supply of the heat transfer vehicle as shown in Figure 5. The heat transfer vehicle flows downwardly over the surfaces of the guide tubes 10a to collect in the catch basin 73 in which the level 73a is maintained, the transfer vehicle being drawn through the suction outlet 74 for return to the space 71 to be redelivered to the guide tubes.

With the apparatus shown, standard shell and tube heat transfer devices are employed and accomplish an economical arrangement and develop a maximum production in a minimum of space. The refrigerating medium flowing downwardly through the downcomer 25a, rises in the accumulator and flows through the nipples 69 into the drum housings 68, flowing around the several guide tubes 10a therein for the rapid absorption of heat from the heat transfer vehicle and the comestible or perishable being frozen, the absorption of heat effecting partial vaporization of the liquid refrigerant with the gas and liquid refrigerant outletting through the upper nipples 70 into the upper end of the accumulator 5b and drawn through the pipes 5a by suction apparatus to a compressor for re-circulation through the system.

In the form of apparatus shown in Figures 6 and 7, it is intended to associate therewith the form of freezing cartridge shown in Figure 15, and in this form of apparatus, a liquid heat transfer vehicle is alone used to the exclusion of refrigerating medium. The refrigerating case 76 has a removable cover 77 forming a substantially air-tight connection therewith when in position, the casing 76 containing headers 78 and 79 supported by standards 80, the headers being spaced from the top and bottom of the casing providing a space adjacent the top for the pan 81 receiving the liquid heat transfer vehicle through inlets 82 while a catch basin 83 is provided at the lower end of the casing for the heat transfer vehicle flowing through the casing and which is drawn therefrom through the outlet 84 to be recooled and returned to the pan 81 through inlet 82. As shown in Figures 6 and 15, the bottom header 79 carries a plurality of tubular cartridge supports 85 that are open at their lower ends and are provided with inwardly positioned centering lugs 86 for the cartridges 87, the upper ends of the cartridges having circumferentially spaced lugs 88 fixed thereto and received in annular distributing openings for the heat transfer vehicle provided in the upper face of the top header 78. The cartridges 78 are closed in their lower ends and the open upper ends thereof may be closed by any suitable form of cap, such as shown in Figure 13, the heat transfer vehicle, preferably in the form of brine solution flowing downwardly from the pan 81 over the exterior surfaces of the cartridge 87, thoroughly wetting the same for the absorption of heat from the comestible or perishable being frozen, the heat transfer vehicle collecting in the catch basin 83 and drawn therefrom through the outlet 84 for recooling and recirculation through the casing. Also, as shown in Figure 7, cartridge supports 85, openings in the top header 78 for the passage of the cartridges and the cartridges may assume any appropriate configuration desired, several forms being illustrated. In this form of the apparatus, the frozen comestible or perishable is harvested from the upper end of the casing 76, it being understood that a warm liquid may be caused to flow over the cartridges to permit easy removal of the containers from the cartridges.

Figure 11:
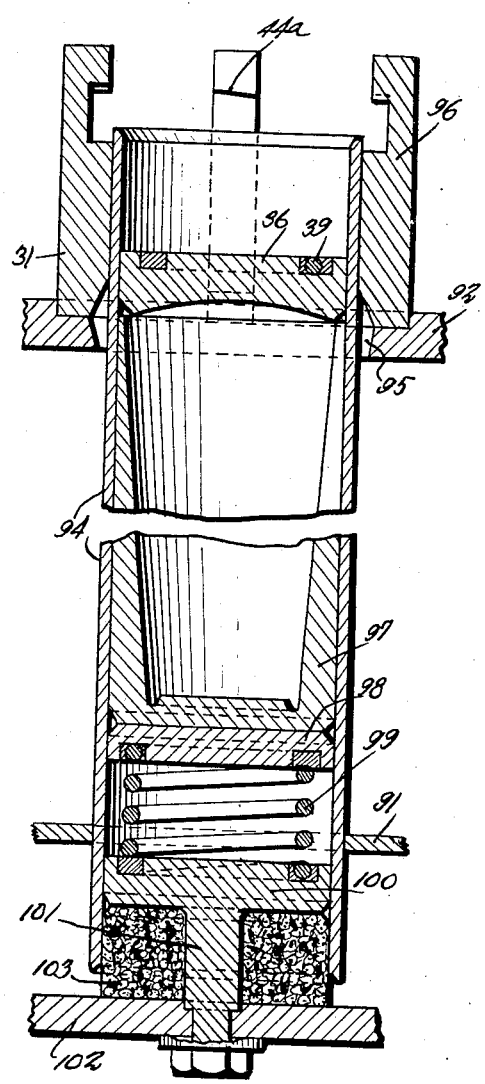
Figure 11 is a longitudinal sectional view, broken away of another form of cartridge used with the form of invention illustrated in Figures 8 and 9 and capable of being harvested from either end of the aparatus.

It is also contemplated to modify the lower construction of the several forms of casings whereby frozen containers may be harvested from the bottom of the apparatus, one of such forms being illustrated in Figures 8 and 9 and the particular character of cartridge permitting bottom harvesting is illustrated in Figure 11.

The refrigerator casing 89 is supported in an elevated position by legs 90 and the casing may be constructed of any desired design or configuration, the same being herein illustrated as circular in plan view, the casing comprising a bottom header 91 and a top header 92 spaced from the removable cover 93 that is mounted therein in a substantially air-tight condition. A plurality of cartridge guide tubes 94 are permanently anchored in the bottom header 91, projecting below said header while the upper ends of the cartridge guide tubes 94 project through brine distributing openings 95 provided in the top header 92, the upper projecting ends of the guide tubes 94 carrying circumferentially spaced lugs 96 having their lower ends permanently anchored, as by welding in annular pockets provided in the upper face of the header 92 surrounding the opening 95. Containers 97 of any desired configuration for the comestibles or perishables to be frozen are confined in the guide tubes 94, and a cap closure of the type illustrated in Figure 10 is employed for closing the upper end of the guide tube 94, the upper ends of the lugs 96 having cam shoulders 44a cooperating with corresponding shoulders upon the closure cap 41. The bottom container 97 in the guide sleeve 94 rests upon the follower block 98 having one end of a coiled spring 99 permanently engaged therewith while the other end of the coil spring is permanently engaged with a block 100 carrying a depending stem 101 projecting from the lower end of the guide tube 94 for attachment to a harvesting plate 102, insulation 103 such as cork or the like being confined between the harvesting plate 102 and the block 100. The heat transfer vehicle, such as brine is delivered to the chamber 104 above the upper header 92 to be distributed over the guide tube 94, thoroughly wetting the surfaces thereof through the distributing space 95 for collection upon the bottom header 91, the brine being delivered to the space 104 through inlets 105, while an overflow 106 for the chamber 104 has a pipe connection 107 with an external catch basin 108 that is fully insulated, the brine solution in the catch basin or bottom header having an overflow in communication with the catch basin 108, the latter having a return pipe 109 to cooling apparatus for rechilling the heat transfer medium for recirculation through the system.

The heat transfer vehicle is caused to flow into the chamber 104 to assume a constant level and to be directed in a film by the guide spaces 95 over the outer faces of the guide tubes 94, gravitationally falling upon the bottom header 91 for drainage into the catch basin 108. To harvest the frozen comestibles or perishables in the containers 97, a warm fluid may be caused to enter the chamber 104 to flow over the guide tubes 94, whereupon the containers 97 may be harvested from the lower ends of the guide tubes 94 upon downward shifting movement of the harvesting plate 102 which opens the lower ends of the guide tubes and which harvesting plates may be operated in any convenient manner.

In the forms of the invention shown in Figures 1 to 5, it is intended to use a heat transfer vehicle and a refrigerating medium, the latter being employed for the rapid absorption of heat from the heat transfer vehicle, the apparatus being so designed that relatively long cartridges or relatively short containers containing comestibles or perishables to be frozen are evenly chilled over the entire length thereof occasioned by the counter-flow of the heat transfer vehicle and the refrigerating medium. In the form of apparatus shown in Figures 6 to 9, the heat transfer vehicle alone is employed, there being present in these forms of the invention, however, the idea of freezing comestibles or perishables in elongated form irrespective of cross sectional configurations.

As stated, it is intended to modify the lower or base constructions of the different forms of apparatus so that harvesting equipment may be associated with the outlet ends of the guide tubes or cartridges to provide continuously operating mechanism, i. e., containers for comestibles or perishables are to be fed to one end of the guide tubes and delivered from the other end thereof in a frozen condition, and harvesting apparatus appropriate to the apparatuses shown herein is disclosed in Figures 16 to 30. While it has been herein described that the cartridges specifically described are to be associated with particular forms of apparatus, it is to be understood that the cartridges, with slight alterations may be made universal in their use with the different forms of apparatus.

A cartridge of the general character illustrated in Figure 2 is shown in Figures 26 and 27, the guide tube 110 being fixed to upper and lower header plates 111 and 112 respectively, the guide tube extending below the lower header plate 112 as illustrated and said guide tube between the headers is surrounded by a shell 113 providing a liquid refrigerant space or channel 114 having inlets and outlets 115 and 116 respectively in communication with a refrigerant accumulator. The upper end of the guide tube 110 above the header 111 carries lugs 117 to facilitate mounting of a cap. As illustrated in Figure 26, the guide tube 110 has a plurality of stacked containers 118 therein that are delivered or harvested at the lower end of the guide tube in a manner presently to be described. The liquid heat transfer vehicle flows downwardly through the guide tube 10 and upon the containers 118, thoroughly wetting all surfaces while the action of the liquid refrigerant flowing through the channel 114 is graphically illustrated. Although previously described, it is here noted that the liquid refrigerant flowing through the channel 114 absorbs heat from the liquid transfer vehicle flowing through the guide tube 110, this absorption of heat effecting boiling of the refrigerant in the channel 114 and the formation of gas bubbles in the refrigerant as shown, minute bubbles tend to cling to the opposed faces of the guide tube 10 and shell 113, being wiped or cleaned from the surfaces by the larger bubbles moving in contact with the surfaces, resulting in the elimination of any gas insulation or surface coating and providing a most thorough and constant wetting of the opposed surfaces.

The form of guide tube shown in Figures 22 to 25 and 28 and 29 comprises a guide tube 118 open at its upper and lower ends with circumferentially spaced longitudinally extending internal centering ribs 119 for containers, the ribs being secured in position in any convenient manner, preferably by a weld connection 120 entering the ribs through the outer sides of the tube 118 as shown in Figure 23, the ribs terminating inwardly of opposite ends of the tube. Cylindrical containers arranged in stacked relation are shown in the guide tubes in Figures 24, 25 and 28, while in Fig. 24, adjacent containers are separated by spacer disks 122 temporarily secured to the upper end of each container for purposes presently to appear.

The guide tubes are open at their lower ends and the mechanism for harvesting the containers from the tubes at their lower ends include a latch device associated with each guide tube as shown in Figures 24 to 28. The latch device for each tube includes a bracket 123 secured to one side of the tube adjacent its lower end with a bell crank latch arm pivotally supported in the bracket as at 124, the latch finger 125 extending downwardly from the pivot 124 passing through a side slot 126a at the lower end of the tube with the hook 126 upon the lower end of the finger 125 engaged with the lowermost container for supporting the stack of containers in the tubes and preventing their discharge, the latch finger 125 being retained in operative position by the spring 127 engaged with the latch arm 128. A trigger rod 129 pivotally depends from the outer end of the latch arm 128 as at 130 and a weighted head or button 131 is adjustably connected to the lower end of the operating rod 129.

The harvesting mechanism further includes means for operating the latch devices for the single release of a container from the guide tubes for conveying the discharged or harvested containers to a point for storing or shipment and as shown in Figures 16 to 21, the refrigerator case comprises side walls 132 and end walls 133 of insulation material with guide tubes 134 in the case as shown by dotted lines in Figures 16 and 17, the side and end walls of the case extending a considerable distance below the lower ends of the tubes 134 for seating in a base or foundation 135. A longitudinal rail 136 is mounted upon the base 135 at each side of the refrigerator case exteriorly thereof and said rails are anchored in position by a cross tie rod 137 shown in Figure 21 inclosed by a spacer sleeve 138 between the rails 136 with the threaded ends of the tie rods 137 receiving jamb nuts 139 to provide a rigid mounting or support for the harvesting structure. Transversely aligned pairs of bearings are suitably secured to the rails 136 outwardly of the ends of the refrigerator case and shafts 141 and 142 are respectively journalled in the two pairs of bearings and each shaft on opposite ends adjacent the bearings has an eccentric cam disk 143 keyed thereto, each cam disk being enclosed by a strap 144 having a head 145 at its upper side that has free sliding engagement with a block 146 depending from opposite ends of longitudinally extending side rails 147, means 148 as shown in Fig. 18 being provided to facilitate lubrication of contacting faces of the head 145 of the block 146.

The side rails 147 are connected by tie rods 149 that are enclosed by spacer sleeves 150 between the rails 147 as shown in Figure 20 with the threaded ends of the tie rods receiving jamb nuts 151 outwardly of the rails. To accommodate mounting of intermediate ones of the tie rods 149, opposite side walls 132 of the refrigerator case are vertically slotted as at 152 permitting vertical shifting movement of the tie rods with the rails 147 in a manner to be presently described. Pairs of bearings 153 are carried by the rails 147 above the bearing blocks 140 upon the rails 136 and support journalled shafts 154 and 155 respectively upon which pulley drums 156 are fixed and over which drums an endless belt 157 of reticulation formation travels, one of the bearings 153 having adjusting means 158 associated therewith for relieving slack in the belt 157. As shown in Figures 16 and 17, the drip pan 159 set into the lower end of the case carries an upwardly and outwardly inclined apron 160 extending through end openings 161 in the case and underlying the drums 156 and outer ends of the endless belt 157 for purposes presently to appear.

As shown in Figures 16 and 20, longitudinally extending angle irons 162 are supported on the tubular spacers 150 adjacent the side walls of the case and upwardly inclined angle irons 163 secured at their lower ends to the angle irons 162 are fixed to and supported at their upper ends, longitudinally extending T-irons 164, the angle irons 163 being secured to the cross head of the T-irons while the legs 165 of the T-irons at opposite sides of the case extend toward each other and constitute a support for the upper run of the endless screen belt 157. A cross angle iron 166 is secured to the under sides of the leg 165 of the T-irons 164 directly beneath each guide tube 134 and a filler strip 167 is carried by the upper face of the angle iron 166 with which the endles belt 157 is engaged.

To assure direct vertical movement of the rails 147 carrying the endless belt 157, brackets 168 are secured to the rails 147 and carry guide bearings 169 for a vertical standard 170 rising from the lower base rails 136, one of said guides being shown at opposite sides of the structure, but it is to be understood that this feature of the invention may be duplicated if desired.

A separate drive is provided for the elevating mechanism comprising the eccentrics 143 for raising the rails 147 and the endless belt carried thereby, and for operating the endless belt, the driving means for the elevating mechanism including the motor 171 shown in Figure 30 that has a belt connection with the pulley 172 secured to one end of the shaft 141, the opposite end of the shaft 141 and corresponding end of the shaft 142 carrying sprocket wheels 173 over which a sprocket chain passes for simultaneous operation of the shafts 141 and 142 and the eccentric cams 143 carried thereby. The drive for the endless belt 157 includes the motor 174 snown in Figure 30 to be mounted upon the platform 175 carried by a side rail 147 with a belt connection between the motor 174 and the pulley 176 that is keyed to the shaft 177 journalled in bearings 178, the shaft 178 carrying a pinion that meshes with the gear wheel 179 upon the shaft 154, the peripheral faces of the pulley drums 156 being suitably treated to provide frictional contact with the reticulated belt 157 to insure movement thereof.

The motors are so associated that when one motor is brought to rest, the other motor is placed in operation, and wiring arrangement for accomplishing this purpose is shown in Figure 30. The operation of the motors includes circuit wires leading from the source of energy in communication with the motors and having set therein terminals $a$ and $b$ with which a pair of connected contacts $c$ and $d$ is associated, the contact $c$ being normally engaged with the strip terminal $a$, while the contact $d$ is normally spaced from the terminal $b$. Another pair of terminals $e$ and $f$ is included in the circuit wires to be engaged by a pair of connected contacts $g$ and $h$, the contact $h$ being normally engaged with the terminal $e$ while the contact $g$ is normally spaced from the terminal $f$. The lead in wire $i$ from a source of energy has a wire connection $j$ with the terminal $a$ while the contact $c$ normally engaged with the terminal $a$ has a wire connection $k$ with the terminal $e$ while the contact $h$ normally engaged with the terminal $e$ has a wire connection $m$ with one side of the motor 174 while the wire $n$ from the other side of the motor returns to the source of electrical energy.

With the switch mechanism embodied in this particular circuit being closed, current flows through the motor 174 for operating the same for moving the endless conveyor belt 157, the terminals and contacts $a$ to $d$ being diagrammatically illustrated at A in Figure 16, while the contacts and terminals $e$ to $h$ are diagrammatically illustrated at B in Figure 19. As shown in Figures 16 and 30, the endless conveyor belt 157 carries an outwardly directed lug 180 that moves into engagement with the contact $d$ for separating the contact $c$ from the terminal $a$ and moving the contact $d$ into engagement with the terminal $b$ where the same is momentarily held until the lug 180 escapes the contact $d$ whereupon a spring device associated with the contacts $c$ and $d$ restore the same to their original position as illustrated. When the contact $d$ is engaged with the terminal $b$ and the contact $c$ spaced from the terminal $a$, the flow of current through the wires $j$ and $k$ is discontinued, the current then flowing over the wire $o$ to the terminal $b$, contact $d$, and pipe $p$ to one side of the motor 171, the wire $q$ from the other side of the motor 171 being in communication with the outlet wire $n$ to the source of energy. The motor 174 at this time is at rest while the motor 171 is in operation for effecting the elevating mechanism for the endless conveyor 157 by the vertically movable contact mechanism B shown in Figure 19 and during such movement, the contact $h$ is spaced from the terminal $e$ while the contact $g$ moves into engagement with the terminal $f$ and as the contact $d$ has become separated from the terminal $b$, the current flows over the wire $i$ and wire $r$ connected thereto to the contact $g$ and terminal $b$ that is in communication with the wire $p$, thence through the motor 171, wire $q$ and wire $n$. The contacts $c$ and $d$ are movable by the lug 180 upon the endless conveyor 157 while the contacts $g$ and $h$ are carried by the vertically shiftable frame as shown in Figure 19.

With the harvesting mechanism in the position shown in Figure 16, the elevating mechanism is in its lowered position with containers 181 illustrated by dotted lines upon the conveyor 157, the contacts $c$ and $h$ being engaged with the terminals $a$ and $e$ respectively with the motor 174 operating to move the conveyor. The conveyor continues in its operation until the lug 180 upon the feed belt operates the contact mechanism A, diagrammatically illustrated in Figure 16, whereupon operation of the motor 174 and movement of the belt 167 is stopped and the motor 171 placed in operation, through the contact mechanism B shown in Figure 19, the cam members 143 shown in Figure 18 raising the structure supporting the endless conveyor and causing the endless belt 157 and particularly the point thereof including the angle iron strip 166 shown in Figure 20 and the support 167 to move into engagement with the buttons 131 of the latch devices for disengaging the lowermost container in a guide tube of the freezing apparatus. As soon as a container is released from the guide tube, the nose 126 of the latch arm 125 wipes over the side of the container and is positioned for engagement with the lower edge of the next descending container as will be obvious from an inspection of Figure 26. Where the containers are of comparatively light weight, the inherent force embodied in the spring 127 associated with the latch arm 125 will cause slight lateral shifting movement of the upper end of a container 121, such as shown in Figure 28 when the upper end of the lower container moves downwardly beyond the lower ends of the guide ribs 119 so that the nose 126 of the latch arm is positioned for contact with the lower end of the next adjacent container. In the event that the containers are comparatively heavy and a long stack is enclosed in a guide tube, spacers 122 as shown in Figure 24, being of less diameter than the containers 121 are employed so that the nose 126 of the latch arm unrestrictedly moves into engagement with the lower edge of the descending container. As soon as the elevating mechanism is lowered, the contacts g and h associated with the terminals e and f are operative for stopping the motor 17' while the contact c being engaged with the terminal a closes the circuit to the motor 174 for the operation of the endless conveyor belt 157 to move the containers 181 as shown in Figure 16 through the opening 161 in the end of the refrigerator case. It is to be understood that the motor 174 may be of a reversible character to cause the endless conveyor belt 157 to alternately travel in an opposite direction for the delivery of containers of the same configuration alternately arranged in the guide tubes in one direction.

The heat transfer vehicle flowing downwardly through the guide tube and over the containers stacked therein escapes at the lower end of the tube and percolates through the endless reticulated belt 157 to be received in the catch basin 159 and drawn therefrom by suction apparatus through the outlet 159a for return to the upper end of the refrigerator case for re-circulation. The reticulated feed belt is of a character to be unaffected by the liquid heat transfer vehicle that flows in contact therewith, the inclined aprons 160 catching all precipitation from the feed belt for return thereof to the catch basin 159. When relatively small containers are utilized, such as shown in Figures 26 and 28, the operation of the freezing apparatus may be of a continuous character i. e., the containers are set into the upper ends of the guide tubes with content thereof frozen by the time the containers reach the lower harvesting ends of the tube, alternate operation of the motors 171 and 174 being continuous for raising the elevating mechanism for the operation of the latch devices associated with the lower harvesting ends of the tube with the containers delivered upon the endless feed belt discharged from the desired side of the refrigerator case. It is also to be understood that the harvesting apparatus shown in Figures 16 and 17 may be associated with the refrigerator cases illustrated in Figures 1 to 9 by slightly modifying the case structures to include lengthening of the walls thereof, and the lowering of the catch basins to provide area for the positioning of the harvesting apparatus.

From the above detailed description of the invention, it is believed that the construction and operation thereof will at once be apparent, it being noted that there is herein provided apparatus for the freezing of comestibles or perishables in either elongated form or in relatively short containers combined with harvesting apparatus for the automatic extraction of containers from the freezing apparatus, the freezing of the comestibles or perishables being accomplished in the presence of a liquid heat transfer vehicle, or a liquid to liquid transfer of heat, such as a liquid heat transfer vehicle and a liquid refrigerant, and while there are herein shown and described the preferred embodiments of the present invention, it is nevertheless to be understood that minor changes may be made therein without departing from the spirit and scope of the invention as claimed.

I claim:—

1. Apparatus for refrigerating a cartridge comprising a guide tube for the reception of the cartridge, means for flowing a heat transfer vehicle over the adjacent walls of the cartridge and guide tube, and means for flowing a refrigerating medium over the external surface of the guide tube.

2. Apparatus for refrigerating containers comprising a guide tube for the reception of the containers, means for flowing a heat transfer vehicle over the adjacent walls of the containers and guide tube, a shell inclosing the guide tube and closed at its ends, and means for flowing a refrigerating medium through the shell in contact with the external surface of the guide tube.

3. Apparatus for refrigerating containers comprising a guide tube for the reception of the containers, means for flowing a heat transfer vehicle over the adjacent walls of the containers and guide tube, a shell inclosing the guide tube and closed at its ends, and means for flowing a refrigerating medium through the shell in contact with the external surface of the guide tube, in a direction of flow counter to the direction of flow of the heat transfer vehicle.

4. Apparatus for refrigerating containers comprising a guide tube for the reception of the containers, means for flowing a heat transfer vehicle over the adjacent walls of the containers and guide tube, a shell inclosing the guide tube and closed at its ends, and means for flowing a refrigerating medium through the shell in contact with the external surface of the guide tube and said shell terminating inwardly of the ends of the guide tube.

5. Apparatus for refrigerating containers comprising a guide tube for the reception of the containers, means for flowing a heat transfer vehicle over the adjacent walls of the containers and guide tube, a shell inclosing the guide tube and closed at its ends, means for flowing a refrigerating medium through the shell in contact with the external surface of the guide tube, said guide tubes being arranged in multiple, a refrigerant accumulator for the refrigerating medium, a bottom liquid refrigeration supply pipe forming communication between the lower end of the accumulator and the lower ends of the shells, and a top refrigerant and gas return pipe forming communication between the upper ends of the shells and accumulator.

6. Apparatus for refrigerating a cartridge comprising a guide tube for the reception of the cartridge, means for flowing a heat transfer vehicle over the adjacent walls of the cartridge and guide tube, a shell inclosing the guide tube and closed at its ends, means for flowing a refrigerating medium through the shell in contact with the external surface of the guide tube in a direction of flow counter to the heat transfer vehicle, said guide tubes being arranged in multiple, a refrigerant accumulator for the refrigerating medium, a bottom liquid refrigeration supply pipe forming communication between the lower end of the accumulator and the lower ends of the shells, and a top refrigerant and gas return pipe forming communication between the upper ends of the shells and accumulator.

7. Apparatus for refrigerating containers comprising a guide tube for the reception of the containers, means for flowing a heat transfer vehicle over the adjacent walls of the containers and guide tube, a shell inclosing the guide tube and closed at its ends, means for flowing a refrigerating medium through the shell in contact with the external surface of the guide tube and said shell terminating inwardly of the ends of the guide tube, said guide tubes and shells being arranged in multiple, a refrigerant accumulator for the refrigerating medium, a bottom liquid refrigeration supply pipe forming communication between the lower end of the accumulator and the lower ends of the shells, and a top refrigerant and gas return pipe forming communication between the upper ends of the shells and accumulator.

8. Apparatus for refrigerating a cartridge comprising a guide tube for the reception of the cartridge, means for flowing a heat transfer vehicle over the adjacent walls of the cartridge and guide tube, means for flowing a refrigerating medium over the external surface of the guide tube, said cartridge including an elongated casing, and means for centering the cartridge in the guide tube.

9. Refrigerating apparatus comprising a casing having a plurality of guide tubes therein, cartridges containing comestibles to be frozen insertible in the tubes, a pan in the casing for a liquid heat transfer vehicle having openings therein through which the upper ends of the tubes extend and a distributing ring surrounding each tube for directing the heat transfer vehicle over the surface of the cartridge.

10. Refrigerating apparatus comprising a casing having upper and lower headers, cup-shaped guide and centering supports carried by the lower header, removable cartridges or containers for comestibles adapted to be mounted in the supports, the upper header having openings therein for the passage of the cartridges or containers and means on the cup-shaped supports and upper ends of the cartridges for centering the cartridges or containers in the headers and to effect distribution of a liquid heat transfer vehicle on the exterior surfaces of the cartridges or containers.

11. Apparatus for refrigerating a cartridge comprising a guide tube for the reception of the cartridge, means for flowing a heat transfer vehicle over the adjacent walls of the cartridge and guide tube, and means for flowing a refrigerating medium over the external surface of the guide tube, in a direction of flow counter to the heat transfer vehicle.

12. Apparatus for refrigerating containers for comestibles or perishables comprising a casing, guide tubes therein for the reception of the containers the guide tubes having a heat transfer vehicle flowing therethrough in contact with the containers, and means for flowing a refrigerant over the outer sides of the guide tubes, said refrigerant flowing through a circuitous path in the casing.

13. The method of freezing comestibles and the like consisting of flowing a heat transfer vehicle through a restricted area with containers for comestibles within the restricted area, and completely enveloped by the heat transfer vehicle, and simultaneously flowing a refrigerant medium in close relation to the heat transfer vehicle.

14. A freezing and harvesting apparatus comprising guide tubes adapted to receive relatively short containers, a case inclosing the tubes, an endless harvesting belt beneath the tubes, means on the tubes to be engaged by the belt for singly releasing a container therefrom, and means for raising and lowering the endless belt.

15. A freezing and harvesting apparatus comprising guide tubes adapted to receive relatively short containers, a case inclosing the tubes, an endless harvesting belt beneath the tubes, means on the tubes to be engaged by the belt for singly releasing a container therefrom, means for raising and lowering the endless belt, and separate drives for the belt and raising means alternately operable.

16. The combination with freezing apparatus, of harvesting mechanism associated therewith to receive containers from the freezing apparatus and convey them therefrom, cooperating devices carried by the freezing apparatus and harvesting mechanism for releasing the containers from the freezing apparatus, the harvesting mechanism including an endless conveyor, a supporting frame therefor, elevating means for the frame and separate drives for the conveyor, and elevating means alternately operating to raise and lower the frame and operate the conveyor.

17. Freezing and harvesting apparatus for comestibles and the like comprising a casing, guide tubes therein for the reception of containers in stacked relation, means for flowing a heat transfer vehicle over the containers in contact therewith, and continuously operating means movable through the casing adjacent the outlet ends of the tubes and cooperating with the tubes for intermittently harvesting the containers from the outlet ends of the guide tubes.

18. Freezing and harvesting apparatus for comestibles and the like comprising a casing, guide tubes therein for the reception for containers in stacked relation, means for flowing a heat transfer vehicle over the containers in contact therewith, continuously operating means movable through the casing adjacent the outlet ends of the tubes and cooperating with the tubes for intermittently harvesting the containers from the outlet ends of the guide tubes, and means for simultaneously flowing a liquid refrigerant over the exterior surfaces of the guide tubes.

19. Freezing and harvesting apparatus for comestibles and the like comprising a casing, guide tubes therein for the reception of containers in stacked relation, means for flowing a heat transfer vehicle over the containers in contact therewith, continuously operating means movable through the casing adjacent the outlet ends of the tubes and cooperating with the tubes for intermittently harvesting the containers from the outlet ends of the guide tubes, and means for simultaneously flowing a liquid refrigerant over the exterior surfaces of the guide tubes, through restricted areas.

20. In combined freezing and harvesting apparatus, freezing devices comprising a casing with freezing tubes therein for the reception of containers, said tubes being open at their discharge ends, a latch on the tube overlying the end of the tube to confine the containers therein, and harvesting mechanism movable into engagement with the latches to release a container from each tube.

21. In combined freezing and harvesting apparatus freezing devices comprising a casing with freezing tubes therein for the reception of containers, said tubes being open at their discharge ends, a latch on the tube overlying the end of the tube to confine the containers therein, and harvesting mechanism including an endless conveyor belt movable into engagement with the latches to release a container from each tube.

22. In combined freezing and harvesting apparatus, freezing devices comprising a casing with freezing tubes therein for the reception of containers, said tubes being open at their discharge ends, a latch on the tube overlying the end of the tube to confine the containers therein, harvesting mechanism movable into engagement with the latches to release a container from each tube, a frame for the support of the conveyor belt, and means for elevating the frame to move the belt into operative engagement with the latches.

23. In combined freezing and harvesting apparatus, freezing devices comprising a casing with freezing tubes therein for the reception of containers, said tubes being open at their discharge ends, a latch on the tube overlying the end of the tube to confine the containers therein, harvesting mechanism including a conveyor belt movable into engagement with the latches to release a container from each tube, a frame for the support of the conveyor belt, means for elevating the frame to move the belt into operative engagement with the latches, and sequentially operating drives for the conveyor belt and frame raising means for the alternate operations of a complete raising and lowering of the frame and subsequent operation of the conveyor belt.

24. Harvesting mechanism for freezing apparatus comprising an endless conveyor, a supporting frame therefor, means for raising and lowering the frame, in combination with freezing apparatus comprising a casing having an opening therein for the passage of the conveyor, and freezing chambers opening toward the conveyor.

25. Harvesting mechanism for freezing apparatus comprising an endless conveyor, a supporting frame therefor, means for raising and lowering the frame, and sequentially operable drives for the conveyor and said means, operating first to raise and lower the frame and subsequently operate the endless conveyor, in combination with freezing apparatus comprising a casing having an opening therein for the passage of the conveyor and freezing chambers opening toward the conveyor.

26. Harvesting mechanism for freezing apparatus comprising an endless conveyor, a supporting frame therefor, means for raising and lowering the frame, in combination with freezing apparatus comprising a casing having an opening therein for the passage of the conveyor, freezing chambers opening toward the conveyor, and means on the freezing chambers cooperating with the belt to control the discharge of containers in the chambers onto the belt.

27. In rapid freezing, the method of accelerating heat transmission consisting of restricting an exterior area surrounding a receptacle and flowing a liquid refrigerant through the restricted area, restricting an interior area of the receptacle and flowing a liquid heat transferring vehicle therethrough, and confining within the area occupied by the liquid heat transferring vehicle a container with comestibles and the like to be frozen.

28. Apparatus for refrigerating containers comprising a casing having upper and lower headers, cartridges between the headers with their ends extending through the headers and adapted to carry containers for comestibles, means for gravitationally flowing a heat transfer vehicle over the cartridges and the containers in the cartridges being harvestable from either end of the cartridges.

29. Apparatus for refrigerating containers for comestibles or perishables comprising guide tubes for the reception of the containers, means for flowing a heat transfer vehicle over the containers, and means for flowing a refrigerant over the guide tubes.

30. The method of freezing consisting of arranging the material to be frozen in tubular containers of constant diameter throughout their lengths, subjecting the containers to the flow of a liquid heat transferring vehicle and confining the liquid heat transferring vehicle to a restricted area and simultaneously flowing a refrigerant medium in close relation to the liquid heat transfer vehicle.

31. In freezing systems, the method of counterflowing a liquid heat transfer vehicle and a liquid refrigerating medium respectively on inner and outer faces of an enclosure and simultaneously freezing substances within the enclosure through contact with the flowing liquid heat transfer vehicle.

32. In freezing systems, a liquid to liquid transfer of heat consisting of the method of flowing a liquid heat transfer vehicle through a restricted area with containers for comestibles in the restricted area and flowing a liquid refrigerating medium outwardly of the restricted area and in proximity thereto and contacting the heat transfer vehicle with the containers in the restricted area.

33. In freezing systems, a multiple instantaneous liquid to liquid transfer of heat consisting of the method of counter flowing a liquid heat transfer vehicle and a liquid refrigerating medium through separated adjacent areas with containers for comestibles to be frozen in one of the areas and contacting the flowing heat transfer vehicle with the containers.

34. A method of freezing consisting of flowing a refrigerant liquid in a direction counter to the flow of a heat transfer vehicle through adjacent restricted areas with containers for comestibles or the like in one area and contacting the flowing heat transfer vehicle with the containers for the comestibles.

35. A method of freezing comestibles and the like consisting of introducing a heat transfer vehicle to one end of an enclosure charged with comestible containers and introducing a refrigerating medium to the other end of the exterior surface of the enclosure.

36. A method of freezing comestibles and the like consisting of introducing a heat transfer vehicle to one end of an enclosure and introducing a refrigerating medium to the other end of the exterior surfaces of the enclosure and flowing the heat transfer vehicle and refrigerating medium in opposite directions.

37. In freezing systems, the method of flowing a heat transfer vehicle through a restricted area with containers for material to be frozen in the restricted area and counter flowing a refrigerating medium outwardly of the restricted area and in close relation thereto.

WILLIAM J. FINNEGAN.